United States Patent
Norris et al.

(10) Patent No.: US 7,909,244 B2
(45) Date of Patent: Mar. 22, 2011

(54) METHODS OF OPERATING AN IMAGE-BASED SELF-SERVICE CHECK DEPOSITING TERMINAL TO PROVIDE ENHANCED CHECK IMAGES AND AN APPARATUS THEREFOR

(75) Inventors: David W. Norris, Cambridge (CA);
John S. Grabowski, Kitchener (CA);
Bruce A. Reid, Elmira (CA); Steven D. Williamson, Waterloo (CA)

(73) Assignee: NCR Corporation, Duluth, GA (US)

( * ) Notice: Subject to any disclaimer, the term of this patent is extended or adjusted under 35 U.S.C. 154(b) by 678 days.

(21) Appl. No.: 12/004,351

(22) Filed: Dec. 20, 2007

(65) Prior Publication Data
US 2009/0159659 A1 Jun. 25, 2009

(51) Int. Cl.
| | |
|---|---|
| G06Q 40/00 | (2006.01) |
| G07D 11/00 | (2006.01) |
| G07F 19/00 | (2006.01) |
| G06K 5/00 | (2006.01) |
| G06K 7/00 | (2006.01) |
| G06K 7/08 | (2006.01) |
| G06K 7/10 | (2006.01) |
| G06K 7/14 | (2006.01) |
| G06K 9/00 | (2006.01) |

(52) U.S. Cl. ........ 235/379; 235/380; 235/493; 235/435; 235/449; 235/454; 382/137; 382/139; 382/140

(58) Field of Classification Search .......... 235/379, 235/380, 493, 435, 449, 454; 382/137, 139, 382/140
See application file for complete search history.

(56) References Cited

U.S. PATENT DOCUMENTS

| | | | |
|---|---|---|---|
| 6,269,169 B1 * | 7/2001 | Funk et al. | 382/100 |
| 6,282,308 B1 * | 8/2001 | Cossette | 382/137 |
| 6,473,519 B1 * | 10/2002 | Pidhirny et al. | 382/140 |
| 6,573,983 B1 * | 6/2003 | Laskowski | 356/71 |
| 6,774,986 B2 * | 8/2004 | Laskowski | 356/71 |
| 6,903,342 B2 * | 6/2005 | Chien | 250/341.1 |
| 7,215,414 B2 * | 5/2007 | Ross | 356/71 |
| 2002/0001393 A1 * | 1/2002 | Jones et al. | 382/100 |
| 2002/0051562 A1 * | 5/2002 | Sheppard et al. | 382/137 |
| 2002/0191830 A1 * | 12/2002 | Pidhirny et al. | 382/140 |
| 2004/0169846 A1 * | 9/2004 | Ross | 356/71 |
| 2005/0047642 A1 * | 3/2005 | Jones et al. | 382/137 |
| 2005/0169511 A1 * | 8/2005 | Jones | 382/135 |
| 2007/0187579 A1 * | 8/2007 | Wunderer et al. | 250/226 |
| 2008/0107326 A1 * | 5/2008 | Auslander et al. | 382/137 |
| 2009/0169091 A1 * | 7/2009 | Coopman | 382/141 |
| 2010/0000838 A1 * | 1/2010 | Hamasaki | 194/207 |
| 2010/0258629 A1 * | 10/2010 | Huang | 235/449 |
| 2010/0296719 A1 * | 11/2010 | Williamson et al. | 382/137 |

* cited by examiner

*Primary Examiner* — Daniel Walsh
(74) *Attorney, Agent, or Firm* — Michael Chan; Paul W. Martin

(57) ABSTRACT

A method of operating an image-based self-service check depositing terminal having an optical character recognition (OCR) reader comprises the steps of (a) receiving from a self-service depositor a check to be deposited, (b) illuminating the check with infrared radiation, (c) capturing a first image of the check while the check is illuminated with infrared radiation, (d) processing the first check image to provide an enhanced image of the check, and (e) applying OCR techniques to read a magnetic ink character recognition (MICR) codeline from the enhanced check image.

8 Claims, 8 Drawing Sheets

METHODS OF OPERATING AN IMAGE-BASED SELF-SERVICE CHECK DEPOSITING TERMINAL TO PROVIDE ENHANCED CHECK IMAGES AND AN APPARATUS THEREFOR

BACKGROUND

The present invention relates to depositing of checks, and is particularly directed to methods of operating an image-based self-service check depositing terminal, such as an image-based check depositing automated teller machine (ATM), to provide enhanced check images and an apparatus therefor.

In a typical check depositing ATM, an ATM customer is allowed to deposit a check (without having to place the check in any deposit envelope) in a publicly accessible, unattended environment. To deposit a check, the ATM customer inserts a user identification card through a user card slot at the ATM, enters the amount of the check being deposited, and inserts the check to be deposited through a check slot of a check acceptor. A check transport mechanism receives the inserted check and transports the check in a forward direction along a check transport path to a number of locations within the ATM to process the check.

If the check is not accepted for deposit, the check transport mechanism transports the check in a reverse direction along the check transport path to return the check to the ATM customer via the check slot. If the check is accepted for deposit, the amount of the check is deposited into the ATM customer's account and the check is transported to a storage bin within the ATM. An endorser printer prints an endorsement onto the check as the check is being transported to and stored in the storage bin. Checks in the storage bin within the ATM are periodically picked up and physically transported via courier to a back office facility of a financial institution for further processing.

The check acceptor typically includes a magnetic ink character recognition (MICR) reader having a MICR read-head which requires the check to be inserted into the check slot in a single face-up, MICR codeline to the right orientation. If the check was to be inserted into the check slot in one of the three other orientations, then the check would usually be returned to the ATM customer so that the ATM customer can re-insert the check into the check slot in the proper orientation. This may lead to customer confusion and dissatisfaction with the ATM check deposit experience.

One possible solution is to install additional MICR read-heads for the other three possible orientations of the check. However, this solution adds both complexity and cost to the check acceptor. The added complexity also reduces overall reliability of the check acceptor. Another possible solution is to apply known optical character recognition (OCR) techniques to optically read the MICR codeline characters contained in lifted check images. This solution requires the MICR codeline to be isolated from all background printing in order to achieve acceptable read rates. However, most checks today have scenic backgrounds which make it rather difficult to isolate the MICR codeline from the background printing. Moreover, handwritten signatures and memo lines which extend into the MICR codeline of the check also make it difficult to achieve acceptable read rates using OCR techniques. It would be desirable to provide methods of operating the check depositing ATM such that the ATM customer can insert a check into the slot in any orientation and such that complexity and cost associated with operating the ATM are relatively low.

SUMMARY

In accordance with an embodiment of the present invention, a method of operating an image-based self-service check depositing terminal having an optical character recognition (OCR) reader comprises the steps of (a) receiving from a self-service depositor a check to be deposited, (b) illuminating the check with infrared radiation, (c) capturing a first image of the check while the check is illuminated with infrared radiation, (d) processing the first check image to provide an enhanced image of the check, and (e) applying OCR techniques to read a magnetic ink character recognition (MICR) codeline from the enhanced check image.

DETAILED DESCRIPTION

Figure 1:
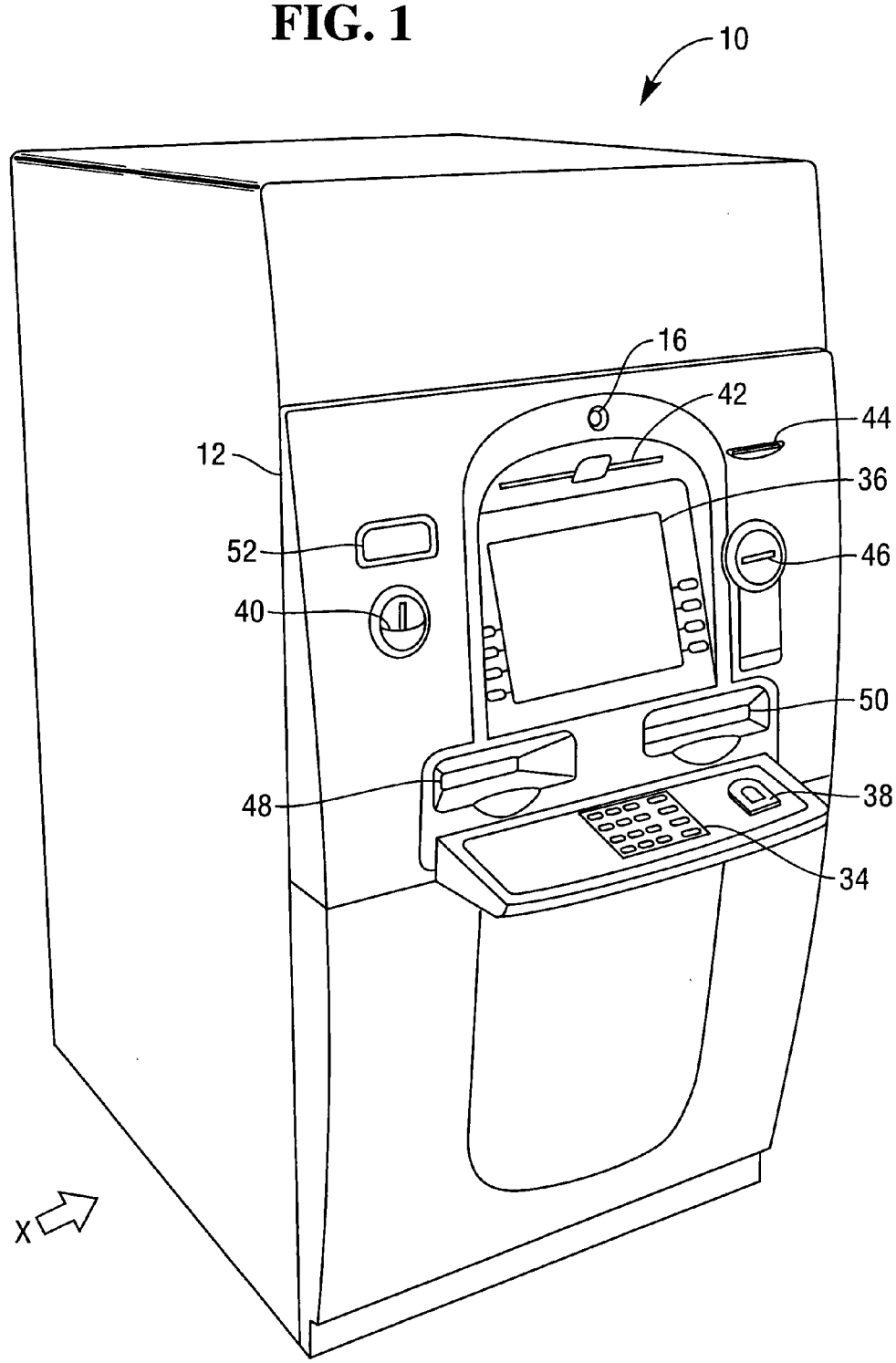
FIG. 1 is a left-front perspective view of an image-based check depositing automated teller machine (ATM) embodying the present invention.

Referring to FIG. 1, a self-service check depositing terminal in the form of an image-based check depositing automated teller machine (ATM) 10 is illustrated. The check depositing ATM 10 comprises a fascia 12 coupled to a chassis (not shown). The fascia 12 defines an aperture 16 through which a camera (not shown) images a customer of the ATM 10. The fascia 12 also defines a number of slots for receiving and dispensing media items, and a tray 40 into which coins can be dispensed. The slots include a statement output slot 42, a receipt slot 44, a card reader slot 46, a cash slot 48, another cash slot 50, and a check input/output slot 52. The slots 42 to 52 and tray 40 are arranged such that the slots and tray align with corresponding ATM modules mounted within the chassis of the ATM 10.

The fascia 12 provides a user interface for allowing an ATM customer to execute a transaction. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR PERSONAS (trademark) 6676 ATM, available from NCR Financial Solutions Group Limited, Discovery Centre, 3 Fulton Road, Dundee, DD2 4SW, Scotland.

Figure 2:
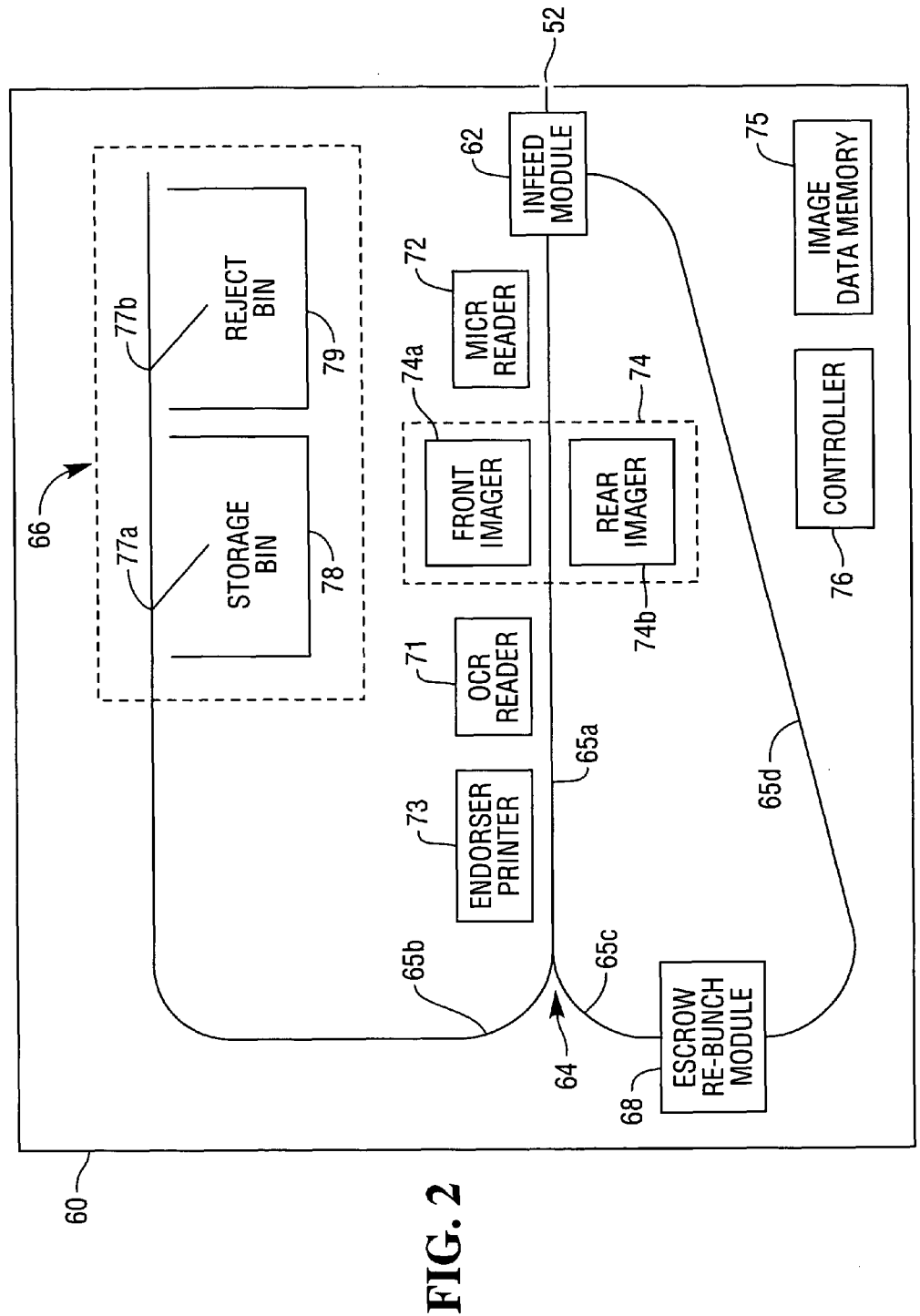
FIG. 2 is a simplified schematic diagram, looking approximately in the direction of arrow X in FIG. 1, of a check processing module of the ATM of FIG. 1.

A check processing module (CPM) 60 will now be described with reference to FIG. 2. FIG. 2 is a simplified schematic diagram (looking approximately in the direction of arrow X in FIG. 1) of part of the fascia 12 and main parts of the CPM 60. The CPM 60 is a modified version of a conventional check processing module, such as a check processing module which can be used in the PERSONAS (trademark) 6676 NCR ATM.

The CPM 60 comprises four main units which includes an infeed module 62, a transport module 64, a pocket module 66, and an escrow re-bunch module (ERBM) 68. The infeed module 62 receives a check which has been deposited into the check input/output slot 52, and transports the check to an inlet of the transport module 64. The dimensions of the infeed module 62, such as its run length, may vary depending upon the particular model ATM the CPM 60 is installed. The structure and operation of the infeed module 62 are conventional and well known and, therefore, will not be described.

The transport module 64 includes a check input/output transport mechanism which receives a check from the inlet adjacent to the infeed module 62, and transports the check along a main document track portion 65a. The transport module 64 includes a diverter mechanism which is operable to divert the check along either a first document track portion 65b to the pocket module 66 or a second document track portion 65c to the ERBM 68. A return document track portion 65d interconnects the ERBM 68 and the infeed module 62 to allow a bunch of checks which has accumulated in the ERBM 68 to be transported back to the infeed module 62.

Figure 3:
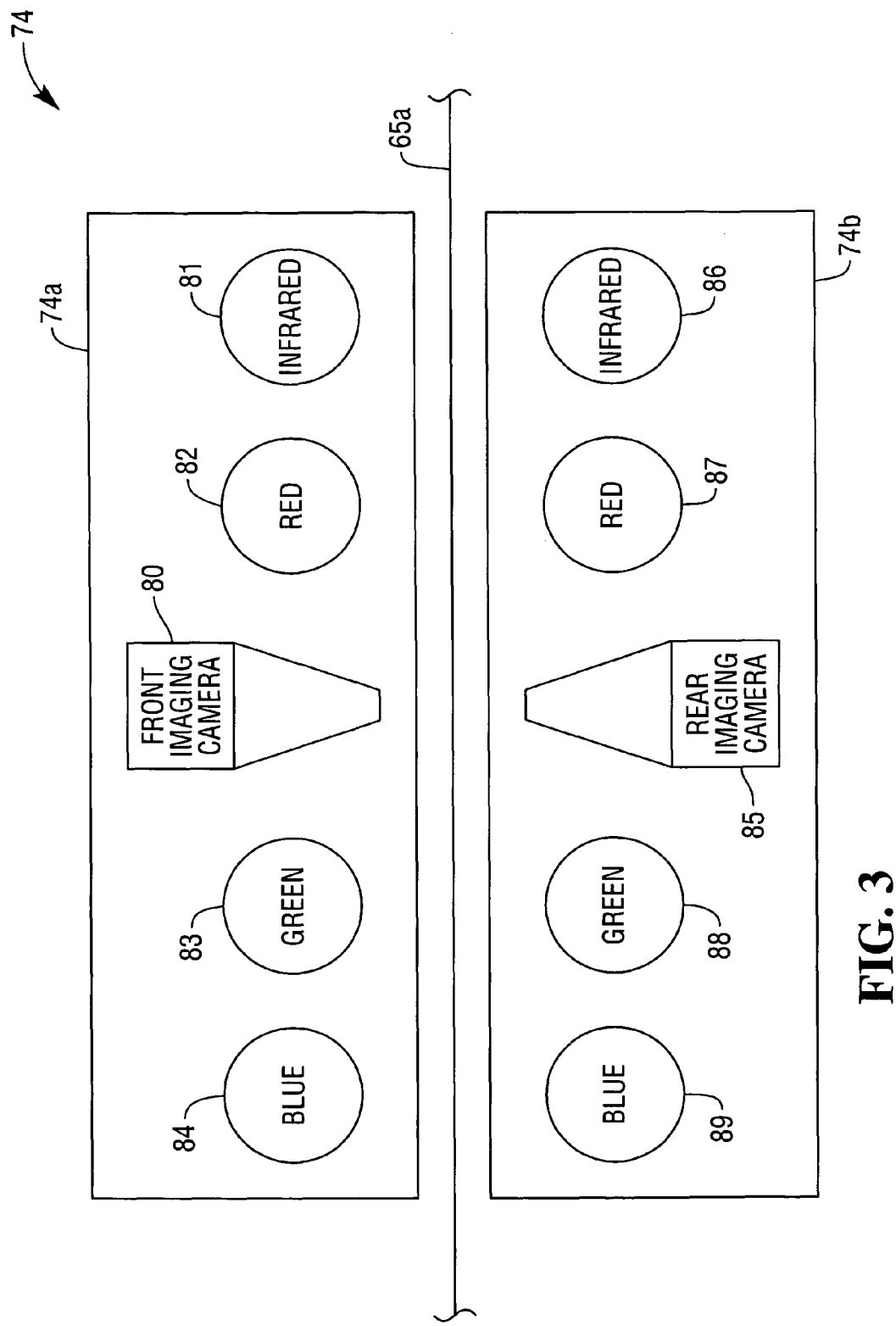
FIG. 3 is a detailed schematic view of a portion (an imager) of FIG. 2.

The transport module 64 further includes a magnetic ink character recognition (MICR) head 72 for reading magnetic details on a code line of a check. The transport module 64 also includes an imager 74 including a front imager 74a and a rear imager 74b for capturing an image of each side of a check (front and rear). As shown in more detail in FIG. 3, the front imager 74a includes a front imaging camera 80, an infrared radiation source 81, a red light radiation source, 82, a green light radiation source 83, and a blue light radiation source 84. Similarly, the rear imager 74b includes a rear imaging camera 85, an infrared radiation source 86, a red light radiation source, 87, a green light radiation source 88, and a blue light radiation source 89. Each of the red light radiation sources 82, 87 may comprise red light emitting diodes (LEDs). Each of the green light radiation sources 83, 88 may comprise green LEDs. Each of the blue light radiation sources 84, 89 may comprise blue LEDs.

Referring again to FIG. 2, an optical character recognition (OCR) reader 71 is provided for optically reading characters from check images lifted by the imager 74. Although the OCR reader 71 shown in FIG. 2 is in the form of hardware, it is conceivable that OCR functionality may be provided in the form of software. Accordingly, the OCR functionality described herein may be in the form of either hardware or software. An endorser printer 73 is provided for printing endorsements onto checks. An image data memory 75 is provided for storing images of checks. A controller 76 is provided for controlling the operation of the elements within the CPM 60.

The pocket module 66 includes a storage bin 78 for storing processed checks. The pocket module 66 further includes a reject bin 79 for storing rejected checks. Two divert gates 77a, 77b are provided for diverting checks to either the storage bin 78 or the reject bin 79. The structure and operation of the pocket module 66 are conventional and well known and, therefore, will not be described.

The CPM 60 may be of a type which processes a bunch of checks or only one check at a time. This type of processing is sometimes referred to as "multiple-check processing". If the CPM 60 is of the type which can process a bunch of checks, then an escrow module (such as the ERBM 68 shown in FIG. 2) is needed. The ERBM 68 is manufactured and available from Glory Products, located in Himeji, Japan. The ERBM 68 allows a bunch of checks (i.e., more than one check) to be processed in a single transaction. If a bunch of checks has accumulated in the ERBM 68 and is unable to be processed further within the CPM 60, then the bunch of checks is transported via the return document track portion 65d back to the infeed module 62 to return the bunch of checks to the ATM customer.

However, if the CPM 60 is of the type which can process only a single check, then the ERBM 68 is not needed. Once a check is received for processing, the check must be deposited into a bin (i.e., either the storage bin 78 or the reject bin 79) before another check can be received for processing. This type of processing is sometimes referred to as "single-check processing". For simplicity, the following description will describe only a single check being processed, even though the CPM 60 shown in FIG. 2 includes an ERBM 68 which is capable of processing a bunch of checks.

Figure 4:
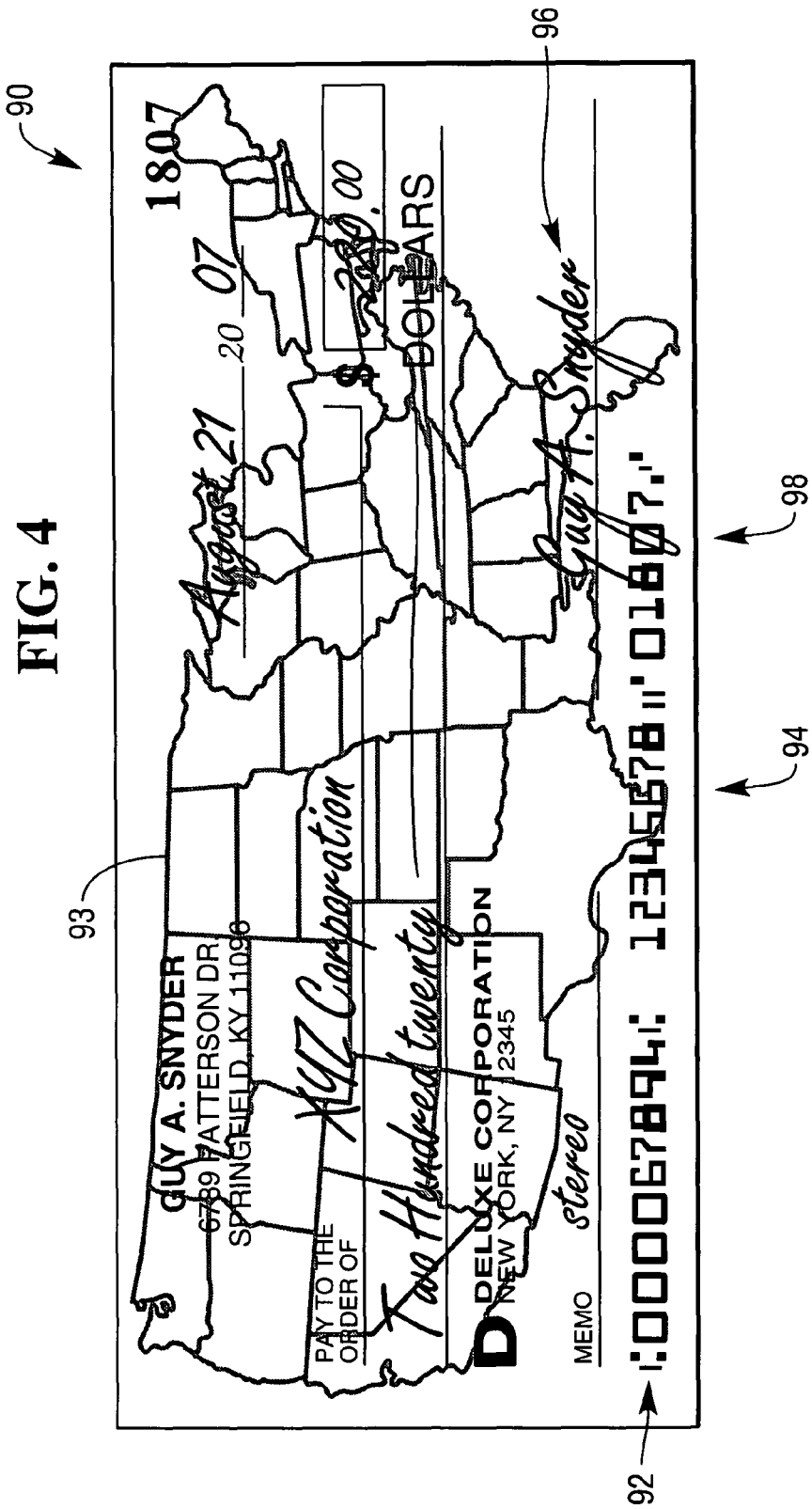
FIG. 4 is a view of an original check received from an ATM customer at the ATM of FIG. 1.

Referring to FIG. 4, an example of an original physical check to be deposited by the ATM customer is shown, and is designated with reference numeral "90". The check 90 includes a number of pre-printed fields including a pre-printed MICR codeline 92. In this example check, the pre-printed fields including the pre-printed MICR codeline 92 are printed using magnetic ink. The check 90 also has background printing in the form of a map outline 93 of the continental United States. It should be noted that a portion of the map outline 93 overlaps a portion of the MICR codeline 92 in a check portion 94 shown in FIG. 4.

The check 90 also has a number of handwritten fields provided by a check payor (who is "Guy A. Snyder" in this example check). The handwritten fields include a signature 96 of the check payor. It should be noted that a portion of the check payor's signature 96 overlaps a portion of the MICR codeline 92 in a check portion 98 shown in FIG. 4.

Figure 5A:
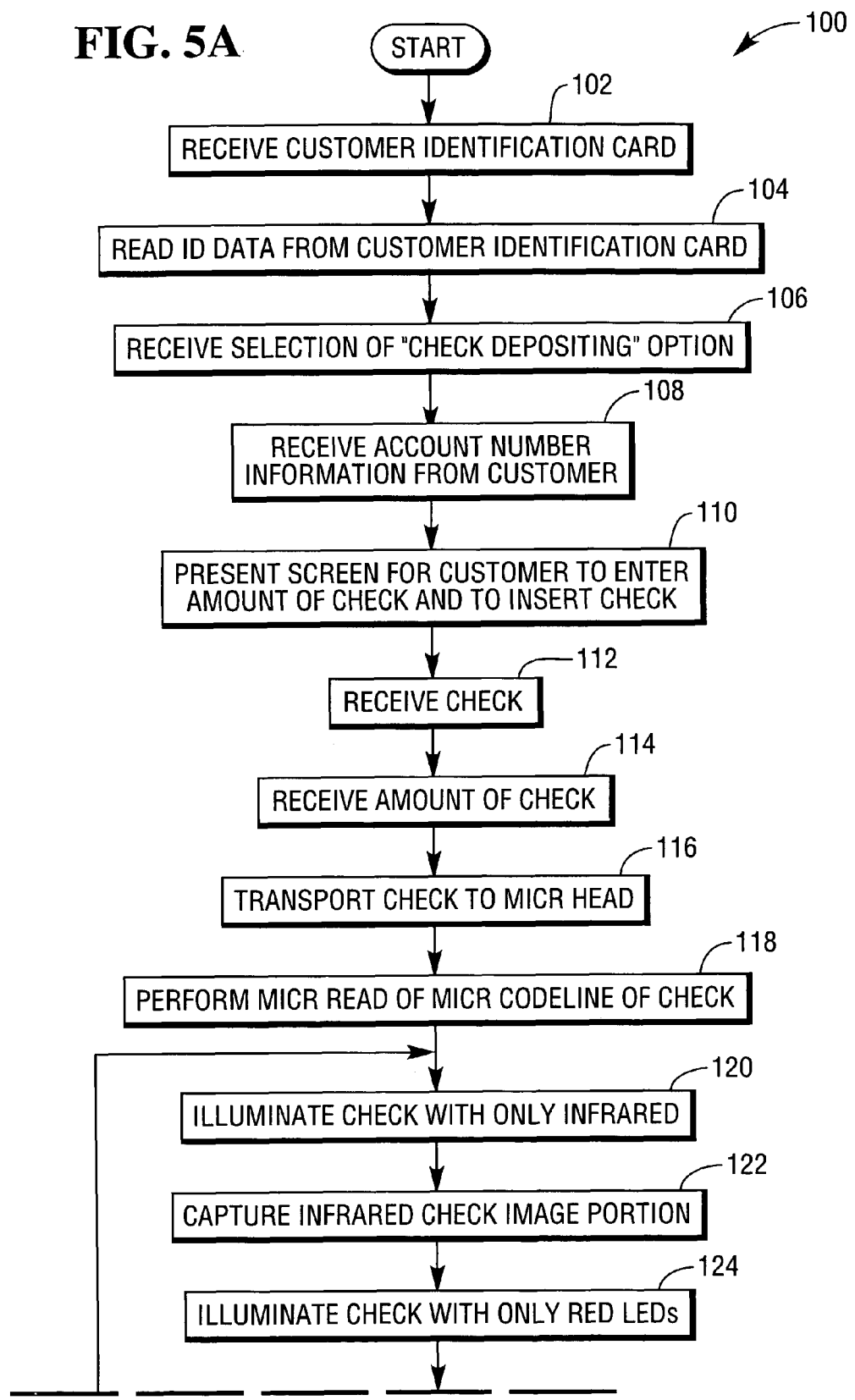
FIG. 5 is a flowchart illustrating steps involved in a check depositing operation in accordance with an embodiment of the present invention.
Figure 5B:
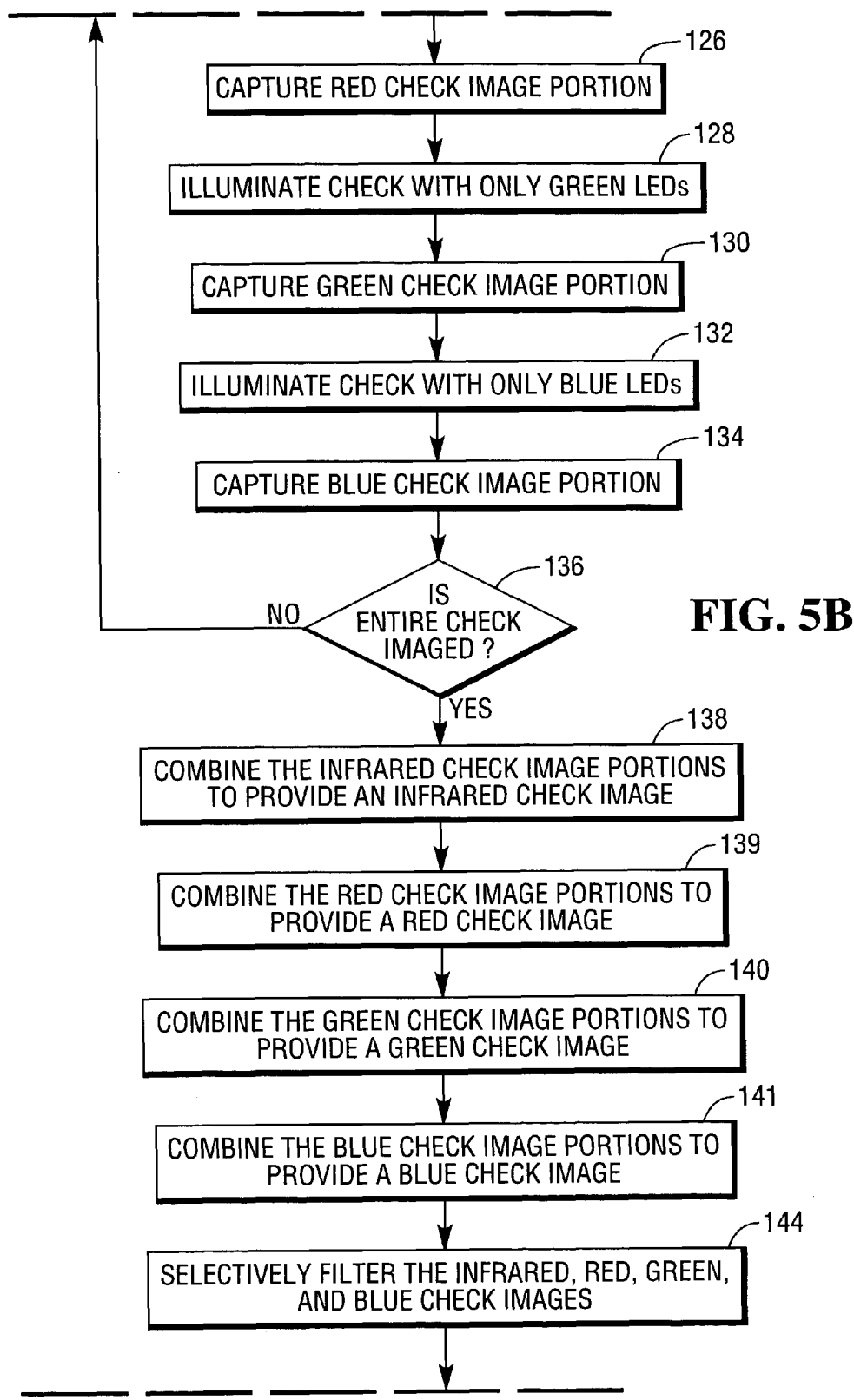
Figure 5C:
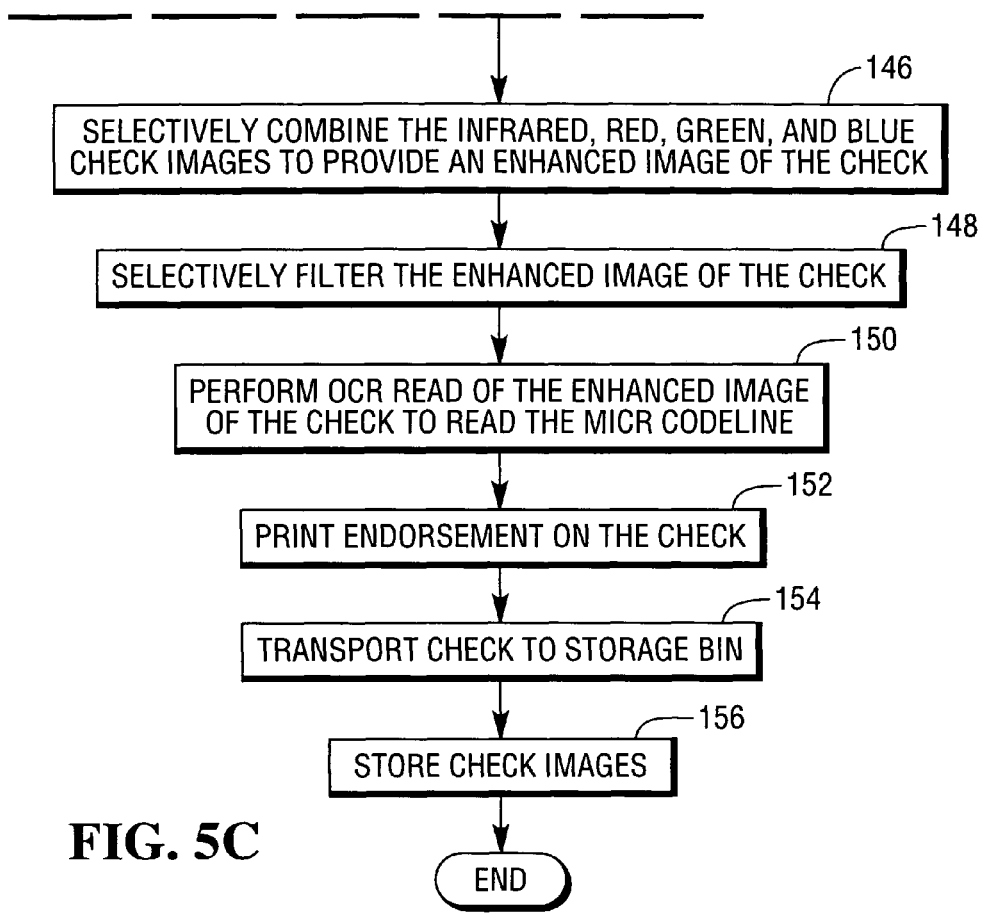
Figure 5:
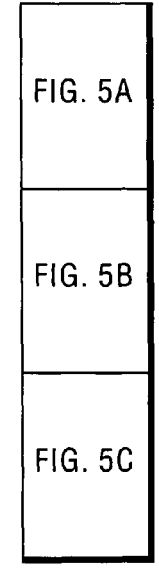

Referring to FIG. 5, a flowchart 100 illustrates steps involved in a check depositing transaction in accordance with one embodiment of the present invention. In the check depositing transaction, the ATM customer inserts a customer identification card into the card reader slot 46 and enters identifying data, like a personal identification number (PIN) to start the transaction (steps 102 and 104). The ATM customer is presented with a screen on the display 36 to select a transaction from a list of transaction options, and selects the "check depositing" option (step 106). The ATM customer also selects an account into which the deposit is to be made (step 108).

The ATM customer is then presented with a screen to enter the amount of the check 90 via the keyboard 34, and to insert the check to be deposited through the check input/output slot 52 (step 110). The ATM customer inserts the check 90 (step 112), and enters the amount of the check (step 114). The controller 76 receives the amount of the check 90. The infeed module 62 receives the check 90 and transports the check to the inlet of the transport module 64. The transport mechanism of the transport module 64 receives the check 90 and transports the check (step 116) to the MICR head 72 where the MICR codeline on the check is read (step 118).

The transport mechanism of the transport module 64 then transports the check 90 to the imager 74, where both sides of the check are imaged. For simplicity, imaging of only the front of the check 90 will be described in the remainder of the flowchart 100. More specifically, the check 90 is illuminated with only infrared radiation from the infrared radiation source 81 when the check is transported to the imager 74 (step 120). An infrared check image portion is captured as the check 90 is illuminated with only the infrared radiation (step 122).

The check 90 is then illuminated with only the red radiation from the red radiation source 82 (step 124). A red check image portion is captured as the check 90 is illuminated with only the red radiation (step 126). Then the check 90 is illuminated with only the green radiation from the green radiation source 83 (step 128). A green check image portion is captured as the check 90 is illuminated with only the green radiation (step 130). Similarly, the check 90 is then illuminated with only blue radiation from the blue radiation source 84 (step 132). A blue check image portion is captured as the check 90 is illuminated with only the blue radiation (step 134).

A determination is then made in step 136 as to whether the entire check has been imaged. If the determination in step 136 is negative (i.e., the entire check has not yet been imaged), then the process returns back to step 120 and repeats capturing additional check image portions of the check in the manner just described hereinabove until the entire check has been imaged. If the determination in step 136 is affirmative (i.e., the entire check has been imaged), then the process continues to step 138.

After all check image portions are captured, corresponding check images are formed. More specifically, all of the infrared check image portions captured back in step 122 are combined to provide an infrared check image (step 138). All of the red check image portions captured back in step 126 are combined to provide a red check image (step 139). All of the green check image portions captured back in step 130 are combined to provide a green check image (step 140). All of the blue check image portions captured back in step 134 are combined to provide a blue check image (step 141).

It should be apparent from the above description that the infrared, red, green, and blue check image portions are captured in parallel using a multiplexing scheme. Accordingly, the infrared, red, green, and blue check image portions are interleaved and are all captured during one pass of the check in front of the imager 74. It should also be apparent that each of the infrared, red, green, and blue check images is formed from its corresponding check image portions which have been captured during the one pass of the check in front of the imager 74.

Figure 6:
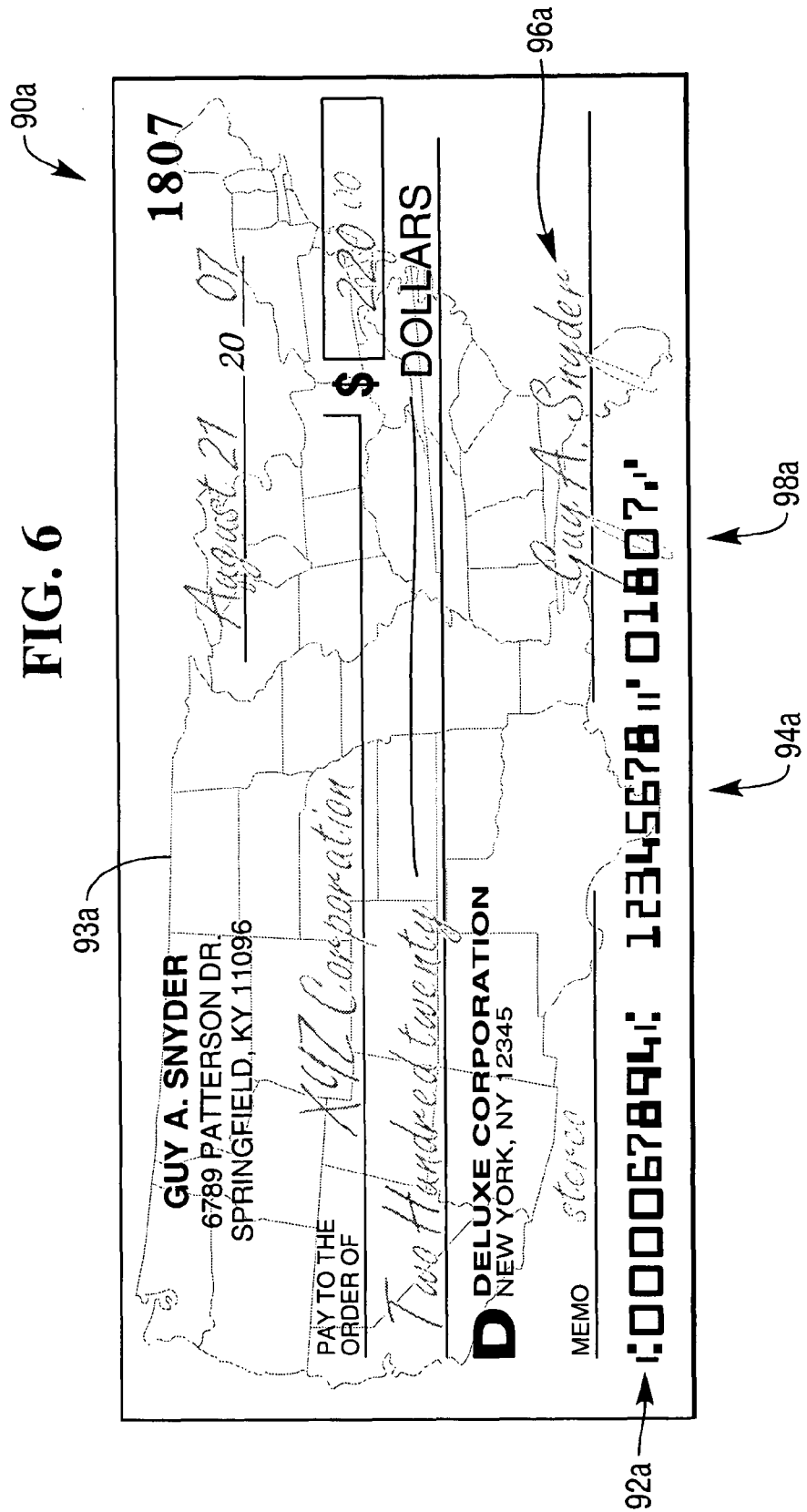
FIG. 6 is a view of an enhanced image of the original check of FIG. 4 in accordance with an embodiment of the present invention.

The infrared, red, green, and blue check images provided in previous steps are selectively filtered (step 144). The selectively filtered images of step 144 are then selectively combined (step 146) to provide an enhanced check image, as shown in FIG. 6 and designated with reference numeral "90a". The enhanced check image 90a contains MICR codeline 92a, map outline 93a of the continental United States, check portion 94a, check payor signature 96a, and check portion 98a. The enhanced check image 90a is selectively filtered (step 148). It should be noted that steps 144 and 148 are optionally performed, depending upon the quality of the enhanced check image 90a which can be provided in step 146. The OCR reader 71 then performs an OCR read of the MICR codeline 92a contained in the enhanced check image 90a (step 150).

The endorser printer 73 prints endorsement data onto the physical check 90 of FIG. 4 (step 152). The endorsed check is then transported along the document track portion 65a to the storage bin 78 of the pocket module 66 (step 154) for subsequent collection and further processing. The captured check images (i.e., the infrared, red, green, and blue check images) are stored in the image data memory 75 (step 156). The check images may be stored locally to the ATM 10. For example, the check images may be stored on an ATM hard drive located within the ATM 10 for a period of time determined by the financial institution. The process then terminates.

Referring to FIGS. 4 and 6, the map outline 93a in the check portion 94a in the enhanced check image 90a of FIG. 6 is faint as compared to the map outline 93 in the check portion 94 in the check of FIG. 4. Also, the check payor signature 96a in the check portion 98a in the enhanced check image 90a of FIG. 6 is faint as compared to the check payor signature 96 in the check portion 98 in the check of FIG. 4. However, the MICR codeline 92a in the enhanced check image 90a of FIG. 6 appears as sharp as the MICR codeline 92 in the check of FIG. 4. Accordingly, the MICR codeline 92a shown in FIG. 6 is easier to read than the MICR codeline shown in FIG. 4.

The MICR codeline 92a shown in FIG. 6 is easier to read than the MICR codeline shown in FIG. 4 because of the use of the infrared radiation source 81 to illuminate the check 90 before the first check image was captured back in steps 120 and 122 of FIG. 5, as will be explained in more detail hereinbelow. It should be noted that while the physical check 90 shown in FIG. 4 is not a check image, it is a fair representation of what a lifted check image would look like if a non-infrared radiation source (i.e., the source contains no infrared radiation) was used to illuminate the check before lifting the check image. An example of such a non-infrared radiation source comprises a combination of red LEDs, green LEDs, and blue LEDs illuminating the check as the check image is being lifted.

It should be apparent that OCR read rates (as performed in step 150 of FIG. 5) associated with reading MICR codelines from enhanced check images (such as shown in FIG. 6) are improved. The OCR read rates are improved because all printing that is not carbon black (such as background printing and handwriting shown on the original check 90 of FIG. 4) on checks are "removed" (as shown in the enhanced check image of FIG. 6) when infrared radiation illuminates the check and the check image is lifted. Since inks used in the printing of MICR codelines contain high levels of carbon black, the MICR codeline remains when the check is illuminated by infrared radiation and the check image is lifted.

It should also be apparent that a method and apparatus are provided for a self-service check depositor to insert a check in any orientation into a self-service check depositing terminal, such as a check depositing ATM. By allowing the check depositor to insert the check in any orientation into the self-service check depositing terminal, the check depositor is provided with a more positive experience in having conducted a self-service check depositing transaction. The check depositor should experience less confusion and more satisfaction with having conducted the self-service check depositing transaction.

Although the above description describes the PERSONAS (trademark) 6676 NCR ATM embodying the present invention, it is conceivable that other models of ATMs, other types of ATMs, or other types of self-service check depositing terminals may embody the present invention. Self-service depositing terminals are generally public-access devices that are designed to allow a user to conduct a check deposit transaction in an unassisted manner and/or in an unattended environment. Self-service check depositing terminals typically include some form of tamper resistance so that they are inherently resilient.

Also, although the above description describes the self-service check depositing terminal 10 which has the MICR codeline reader 72, it is conceivable the present invention may be embodied in a self-service check depositing terminal which does not have a MICR codeline reader. Moreover, it is conceivable that the self-service check depositing terminal 10 may contain more than one MICR reader. Further, although the MICR reader 72 shown in FIG. 2 is located along the main document track portion 65a before the imager 74, it is conceivable that the MICR reader be located instead after the imager.

Further, although the above description describes the CPM 60 which has the ERBM 68, it is conceivable that the present invention may be embodied in a CPM which does not have an ERBM.

Further, although the above description describes the amount of each check being entered by the check depositor, it is conceivable that software which is capable of automatically reading the amount of each check be provided to accomplish this function.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating an image-based self-service check depositing terminal having an optical character recognition (OCR) reader, the method comprising the steps of:
    (a) receiving from a self-service depositor a check to be deposited;
    (b) illuminating the check with only infrared radiation;
    (c) capturing a first image of the check while the check is illuminated with the infrared radiation;
    (d) processing the first check image to provide an enhanced image of the check;
    (e) applying OCR techniques to read a magnetic ink character recognition (MICR) codeline from the enhanced check image;
    (f) illuminating the check with only non-infrared radiation;
    (g) capturing a second image of the check while the check is illuminated with the non-infrared radiation; and
    (h) combining the first and second check images and processing said combined image to provide the enhanced check image.

2. A method according to claim 1, wherein the non-infrared radiation comprises radiation emitted from at least one of red light emitting diodes, green light emitting diodes, and blue light emitting diodes.

3. A method according to claim 1, further comprising:
    (f) accepting the check for deposit when a MICR codeline is able to be read from the enhanced check image; and
    (g) rejecting the check for deposit when a MICR codeline is unable to be read from the enhanced check image.

4. A method of operating an image-based check depositing automated teller machine (ATM) having an optical character recognition (OCR) reader, the method comprising the steps of:
    receiving from an ATM customer a check to be deposited;
    illuminating the check with only infrared radiation;
    capturing a first image of the check while the check is illuminated with the infrared radiation;
    illuminating the check with only radiation from at least one red light emitting diode;
    capturing a second image of the check while the check is illuminated with the radiation from the at least one red light emitting diode;
    illuminating the check with only radiation from at least one green light emitting diode;
    capturing a third image of the check while the check is illuminated with the radiation from the at least one green light emitting diode;
    illuminating the check with only radiation from at least one blue light emitting diode;
    capturing a fourth image of the check while the check is illuminated with the radiation from the at least one blue light emitting diode;
    processing a combination of the first, second, third, and fourth check images to provide an enhanced image of the check;
    applying OCR techniques to read a magnetic ink character recognition (MICR) codeline from the enhanced check image;
    accepting the check for deposit when a MICR codeline is able to be read from the enhanced check image; and
    rejecting the check for deposit when a MICR codeline is unable to be read from the enhanced check image.

5. A method according to claim 4, wherein the step of processing includes the sub-step of selectively filtering the first, second, third, and fourth check images.

6. An apparatus for use in an image-based self-service check depositing terminal, the apparatus comprising:
    a check acceptor for receiving from a self-service depositor a check to be deposited;
    a radiation emitting device including (i) an energizeable infrared radiation source, (ii) an energizeable red light radiation source, (iii) an energizeable green light radiation source, and (iv) an energizeable blue light radiation source;
    an image lift device for lifting an image of a check as the check passes by the image lift device;
    an optical character recognition (OCR) reader for reading a magnetic ink character recognition (MICR) codeline from a check image; and
    a processor for (i) controlling the check acceptor to transport the check to the image lift device, (ii) controlling the radiation emitting device to energize each radiation source at a different time after the check has been transported to the image lift device, (iii) controlling the image lift device to lift a first check image when only the infrared radiation source is energized, a second check image when only the red light radiation source is energized, a third check image when only the green light radiation source is energized, and a fourth check image when only the blue light radiation source is energized, (iv) processing a combination of the first, second, third, and fourth check images to provide an enhanced check image, (v) controlling the OCR reader to read a MICR codeline from the enhanced check image, (vi) controlling the check acceptor to accept the check when the OCR reader is able to read a MICR codeline from the enhanced check image, and (vii) controlling the check acceptor to reject the check when the OCR reader is unable to read a MICR codeline from the enhanced check image.

7. An apparatus according to claim 6, wherein the energizeable red light radiation source comprises a number of red light emitting diodes, the energizeable green light radiation source comprises a number of green light emitting diodes, and the energizeable blue light radiation source comprises a number of blue light emitting diodes.

8. An apparatus according to claim 6, wherein processing the combination of the first, second, third, and fourth check images includes selectively filtering the first, second, third, and fourth check images to provide the enhanced check image.

* * * * *